(12) United States Patent
Löbig

(10) Patent No.: US 7,386,117 B2
(45) Date of Patent: Jun. 10, 2008

(54) EFFICIENT HANDLING OF ISDN CONNECTIONS BY A PACKET-ORIENTED EXCHANGE

(75) Inventor: Norbert Löbig, Darmstadt (DE)

(73) Assignee: Siemens Aktiengesellschaft, Munich (DE)

(*) Notice: Subject to any disclaimer, the term of this patent is extended or adjusted under 35 U.S.C. 154(b) by 659 days.

(21) Appl. No.: 10/491,262

(22) PCT Filed: Jun. 11, 2003

(86) PCT No.: PCT/DE03/01945

§ 371 (c)(1),
(2), (4) Date: Mar. 30, 2004

(87) PCT Pub. No.: WO2004/017644

PCT Pub. Date: Feb. 26, 2004

(65) Prior Publication Data

US 2004/0246942 A1    Dec. 9, 2004

(30) Foreign Application Priority Data

Jul. 31, 2002  (DE) ............................. 102 34 937

(51) Int. Cl.
*H04L 12/66* (2006.01)
(52) U.S. Cl. .................. 379/352; 379/353; 379/355; 379/359; 379/401
(58) Field of Classification Search ........ 370/352–360, 370/401, 403; 379/93.05, 93.32
See application file for complete search history.

(56) References Cited

U.S. PATENT DOCUMENTS

| | | | | |
|---|---|---|---|---|
| 5,185,742 A | * | 2/1993 | Bales et al. ................. 370/469 |
| 5,521,914 A | * | 5/1996 | Mavraganis et al. ........ 370/352 |
| 5,579,381 A | * | 11/1996 | Courville et al. ...... 379/106.09 |
| 5,692,126 A | * | 11/1997 | Templeton et al. ......... 709/249 |
| 5,751,802 A | * | 5/1998 | Carr et al. ............. 379/201.12 |
| 5,949,762 A | * | 9/1999 | Green et al. ................ 370/259 |
| 6,269,100 B1 | * | 7/2001 | Christie et al. ............. 370/401 |
| 6,285,680 B1 | * | 9/2001 | Steinka et al. .............. 370/431 |
| 6,333,940 B1 | * | 12/2001 | Baydar et al. .............. 370/506 |
| 6,542,497 B1 | * | 4/2003 | Curry et al. ................ 370/352 |
| 6,553,116 B1 | * | 4/2003 | Vander Meiden ...... 379/355.08 |

(Continued)

FOREIGN PATENT DOCUMENTS

EP    1 202 530 A    5/2002

(Continued)

*Primary Examiner*—Binh K. Tieu
(74) *Attorney, Agent, or Firm*—Bell, Boyd & Lloyd LLP

(57) ABSTRACT

The invention relates to the representation, independent of access type, of ISDN accesses (PRA, BRA) in the central core (cVst) of a packet-oriented exchange (P-Vst). By adapting the signaling information transmitted by ISDN accesses in a peripheral unit (PE) it is possible to handle different ISDN access types as a uniform access type in the central core (cVst) of the packet-oriented exchange (P-Vst). The adaptation can be performed for example with the aid of a conversion table for the user data references and call references contained in signaling messages. The invention has the advantage of providing a simple, low-cost, low-overhead representation of ISDN data in the central core of the packet-oriented exchange (P-Vst). Changes such as e.g. a concentration of the user data channels can be carried out easily and flexibly by the network management (NetMg).

20 Claims, 7 Drawing Sheets

U.S. PATENT DOCUMENTS

| | | |
|---|---|---|
| 6,587,460 B1 * | 7/2003 | Bell et al. .................... 370/385 |
| 6,744,768 B2 * | 6/2004 | Vikberg et al. ......... 370/395.21 |
| 2001/0007555 A1 * | 7/2001 | Sasagawa et al. .......... 370/359 |
| 2003/0018700 A1 * | 1/2003 | Giroti et al. ................. 709/201 |
| 2004/0022237 A1 * | 2/2004 | Elliott et al. ................ 370/356 |
| 2005/0129198 A1 * | 6/2005 | Sudhir et al. ............ 379/90.01 |
| 2005/0232234 A1 * | 10/2005 | Lobig ......................... 370/352 |

FOREIGN PATENT DOCUMENTS

| WO | WO/01 78416 A | 10/2001 |
|---|---|---|
| WO | WO/02 51195 A | 6/2002 |

* cited by examiner

EFFICIENT HANDLING OF ISDN CONNECTIONS BY A PACKET-ORIENTED EXCHANGE

CROSS REFERENCE TO RELATED APPLICATIONS

This application is the U.S. National Stage of International Application No. PCT/DE2003/001945, filed Jun. 11, 2003 and claims the benefit thereof. The International Application claims the benefits of German application No. 10234937.1 DE filed Jul. 31, 2002, both of the applications are incorporated by reference herein in their entirety.

FIELD OF INVENTION

The invention relates to a method, a peripheral unit and a packet-oriented exchange for exchanging signaling information between an ISDN access and the central component of a packet-oriented exchange.

BACKGROUND OF INVENTION

The convergence or merging of time division multiplex-based networks—also called TDM (time division multiplexing) networks—and packet-based networks leads to new call processing requirements in terms of the conversion of signaling and user data.

In the course of the coordination of time division multiplex-based and packet-based networks with one another—the term "interworking" is also often used here—adaptations are necessary on both the subscriber side and the switching node side.

A TDM-based exchange or TDM-based switching node initiates the call control and the termination or through-connection of the user information channels. On the other hand, the range of tasks of an exchange for data transmission in the packet network—referred to in the following as a packet-oriented exchange—includes, in addition to the conventional call control, the control of the associated user information channels, which are generally routed outside the packet-based exchange, via external devices (e.g. gateways, resource servers, . . . ) which provide suitable interfaces for user data streams (e.g. using the RTP (Real Time Protocol)) and control (e.g. using one of the following protocols: MGCP (Media Gateway Control Protocol), H.248, H.323).

For the terminal device side, as well as the classical analog and ISDN terminals and private branch exchanges there are also terminals which are suitable for the packet network and permit broadband data access, but which in addition are also capable (e.g. using the H.323 protocol or the SIP (Session Initiation Protocol) protocol) of supporting the basic service features known from public telephone networks. Subscriber lines operated by means of suitable xDSL techniques (DSL: Digital Subscriber Line) or cable networks are frequently used as a broadband access medium or access network to the subscriber.

The interface between access network and transmission network, e.g. packet-based IP (Internet Protocol) network, is typically formed by means of subscriber-side adaptation facilities. The term "peripheral adapter" is also frequently used for subscriber-side adaptation facilities. Examples of subscriber-side adaptation facilities are IADs (Integrated Access Devices) for terminating a xDSL link and MTAs (Multimedia Terminal Adapters) on or in the cable modem, which terminate the access network on the transmission network side. The connection of broadband terminal equipment (e.g. PC with Internet access, television set, videophone), as well as that of traditional subscriber terminals, e.g. analog telephone, ISDN telephone, and also analog and ISDN private branch exchanges, is then possible via subscriber-side adaptation facilities and access networks.

Packet-oriented exchanges should, wherever possible, provide all the service features known from line-connected connection technology for traditional terminal devices, i.e. telephones and private branch exchanges, so that the integration of packet-oriented networks does not lead to a restriction of the range of service features offered. At the same time the non-availability of hardware and software resources and the non-accessibility of terminal devices must be detected and where applicable an alert signaled to the operator. Structures of the intermediate access networks are usually not known to the packet-oriented switching node, however. For example, failure situations affecting components and network shares which relate to the signaling path between packet-oriented switching node and subscriber terminal equipment are disclosed to the switching node only indirectly, i.e. via detection of the non-accessibility of subscribers and private branch exchanges.

Traditional analog and ISDN subscribers accessible via a packet network are identified for administrative purposes in a particular way in the packet-based switching node to distinguish them from purely packet-based subscribers (SIP, H.323) and traditional, line-connected analog and ISDN subscribers (e.g. connections via the interfaces V5.1 and V5.2). The peripheral, subscriber-side adaptation facilities possess special functions (e.g. telephony client in IADs and MTAs) which enable the transmission of the signaling information between terminal device and packet-based exchange via intermediate access networks and packet-based transmission networks or wide area networks (WANs). The packet-based switching systems and clients in the peripheral adaptation facilities (IAD, MTA) can be appropriately configured for this purpose by the network management function. From the point of view of the switching system, a distinction is made between analog and ISDN interfaces with regard to the provision of functions in the subscriber-side adaptation facilities for the transmission of the signaling information. A further differentiating feature from the viewpoint of the packet-based switching system is the assignment of service features of a main access line or a private branch exchange line. From the viewpoint of the subscriber, either an analog or ISDN terminal device operated as a main access line is then connected to the peripheral adapter (IAD, MTA), or an analog or ISDN private branch exchange (PBX) is connected in the same way.

With regard to ISDN interfaces, e.g. on the peripheral adaptation facility, a distinction is made between two different access types or interfaces.

With the basic access, also referred to as BRA (Basic Rate Access), one or two user information channels are present. Often there are two user information channels (B channels), each operating at 64 kbit/s (56 kbit/s in the USA), and a signaling channel (D channel) operating at 16 kbit/s.

The second access type, also referred to as PRA (Primary Rate Access), is the primary rate TDM access, usually consisting of 30 B channels (on account of the PCM30 system), a synchronization channel, and a signaling channel (D channel). In accordance with standardization, up to 4 PCM30 systems with a single D channel can likewise be combined into a PRA.

Contrary to the case of a packet-based exchange, the status (Layer 1, Layer 2, blocking state) of the ISDN access (BRA, PRA) is known to a traditional local exchange of a TDM network owing to physical line termination or the interface protocols to subscriber concentrators and access networks.

Small ISDN private branch exchanges must also be connectable for packet networks via a BRA or a plurality of BRAs by means of peripheral adapters; large ISDN private branch exchanges must be connectable via one or more PRAs, whereby it must also be possible to support mixes of BRAs and PRAs with regard to a given ISDN private branch exchange. In this case BRA and PRA are possibly connected and physically terminated via a standardized peripheral adapter or via specific peripheral adapters. The ISDN signaling can then be exchanged between peripheral adapter and packet-oriented exchange using packet-based means (e.g. by means of ISDN User Adaptation IUA and SCTP). This typically takes place by means of the DSS1 (Digital Signaling System No. 1) protocol, details of which are specified in the ITU-T Q.931 standard (ISDN user-network interface layer 3 specification for basic call control).

The object of the invention is to ensure flexible and efficient handling of different ISDN access types by a packet-oriented exchange.

The object is achieved by a method, a peripheral device and a packet-oriented exchange according to the independent claims.

In general, an exchange comprises peripheral units, e.g. access units for subscribers or lines, as well as central units or a central component or core which includes, for example, a central computer platform, a message buffer, a switching matrix, protocol termination facilities, background memory, etc. With regard to a packet-based exchange the existence of a switching network is optical in this arrangement. According to the invention an adaptation is performed in a peripheral unit, by means of which adaptation the different ISDN accesses can be represented and controlled in the central core of the packet-oriented exchange in the same uniform manner. A peripheral unit in which the adaptation according to the invention can be performed is the packet control unit of a packet-oriented exchange which controls the user data transmission over the packet network.

In the context of the method according to the invention, signaling information is exchanged between an ISDN access, for example an ISDN BRA or ISND PRA access, and the central core of a packet-oriented exchange via a peripheral unit of the packet-oriented exchange. An ISDN terminal device or an ISDN private branch exchange, for example, can be connected to the ISDN access. The handling or processing of the signaling information transmitted by the ISDN access takes place in the central core of the packet-based exchange independently of the type of the ISDN access. For example, no distinction is made between ISDN BRA and ISDN PRA accesses in the packet-based exchange. For the purpose of ISDN access type-independent handling of signaling information by the central core of the packet-oriented exchange, signaling information transmitted from the ISDN access to the exchange is adapted in suitable peripheral units of the exchange. Similarly, signaling information transmitted by the central core of the packet-oriented exchange in the direction of the ISDN access is adapted in suitable peripheral units of the exchange in accordance with the ISDN access type. In this way different ISDN accesses can be represented by a single access type in the central core of the packet-oriented exchange. Different ISDN access types generally comprise a different number of user data channels. Thus, the PRA access generally has 30 user data channels and one signaling channel. The BRA access or basic rate access, on the other hand, comprises one or two user data channels and one signaling channel. In the inventive adaptation of signaling information in the peripheral unit, the different user data channels can be mapped onto one another for different access types. In this case user data channels or logical ports in the packet network can be distinguished by the addressing of the packets or the addresses of the packets. In the context of user data transmission in the TDM and in the packet network, the term "bearer" is also often used instead of the term "user data channel". According to the invention, an assignment then exists between logical port or user data channel (bearer( and the provisioning of resources in packet-oriented switching systems. For example, a call processing program can be executed in the packet-oriented switching system in accordance with the logical port or the user data channel. On the ISDN access side, physical ports are provided and also user data channels which are assigned to fixed time slots during the transmission via a TDM network. The signaling information relating to the ISDN access and transmitted to the packet-oriented exchange is often adapted in a peripheral adapter (e.g. IAD or MTA) for transmission to the packet-oriented exchange via a packet network. The signaling information arriving at the peripheral unit is adapted for example with the aid of a table for ISDN access type-independent processing by the central core of the packet-oriented exchange. Such a table can be set up in the peripheral unit by the network management. This is conditional upon the network management knowing the hardware interfaces or the physical ports of the ISDN access in order to be able to set up the table. In contrast to the network management, the details regarding the ISDN access are transparent to the central core of the packet-oriented exchange. The provision of the means for adaptive signaling information transmitted from an ISDN access to the central core of the packet-oriented exchange for the purpose of ISDN access type-independent processing and handling of the signaling information by the central core of the packet-based exchange in a peripheral unit is flexible with regard to changes and configurations. A costly and complex implementation of means for differentiating different ISDN access types in the central core of the packet-oriented exchange is avoided, i.e. the implementation overhead is reduced. This also simplifies the expansion of traditional exchanges by control functions for voice connections routed via a packet network. The inventive adaptation in the peripheral unit also permits a concentration of user data channels. For example, the 30 user data channels of a private branch exchange with PRA access can be mapped to fewer than 15 BRA accesses in the packet-oriented exchange. In this case it is assumed that the previously mentioned logical port type of the packet-based exchange coincides with the ISDN BRA with up to two bearer channels. This is an economical solution when there is only low utilization of the user data channels of the ISDN access. By configuration of the peripheral unit the concentration of the user data channels can be flexibly adjusted as necessary to a change in the utilization of the user data channels of the ISDN access. The inclusion of PRA with more than 30 user information channels is likewise possible in this case.

When there are differences between the logical ISDN accesses in the packet-oriented exchange and the subscriber-side physical ISDN accesses, in addition to a mapping of the user data channel references, e.g. channel numbers, the call ID often has to be adapted also. In this context the call ID denotes the identification information referred to as the "Call Reference" in ITU-T Q.931, ISDN user-network interface layer 3 specification for basic call control. This call reference serves to distinguish calls. In contrast to the call number for a subscriber, the call reference for a connection can assume different values on disjunct line sections. Call references are assigned to connections. After the end of a connection the associated call reference is free again and can be reassigned. Finally, a call reference is only unique within a signaling channel. The latter attribute means that it is necessary for the call reference to be converted in many cases. For example, logical BRA ISDN accesses are used on the exchange side, each of which comprises two basic channels and a signaling channel. A number of these logical BRA ISDN accesses are then mapped to one PRA ISDN access with thirty user data channels and one signaling channel. Consequently, multiple signaling channels are mapped to one signaling channel; in other words, without the call references being adapted, the uniqueness of the call references would be open to question.

Signaling information sent from the ISDN access to the packet-oriented exchange can be transmitted via a peripheral adaptation function in the packet control unit of the packet-based exchange, said function being responsible for adaptations for transmission of the signaling information via a packet network. The D channel protocol DSS1 (Digital Subscriber Signaling System No. 1) is used, for example, for the signaling between ISDN access and peripheral adaptation function of the packet control unit. In this case the packet control unit is a special peripheral unit of the packet-based exchange.

BRIEF DESCRIPTION OF THE DRAWINGS

The invention is explained below in the context of an exemplary embodiment with reference to figures, in which.

DETAILED DESCRIPTION OF INVENTION

In the figures the same reference symbols are used to designate identical elements.

Figure 1:
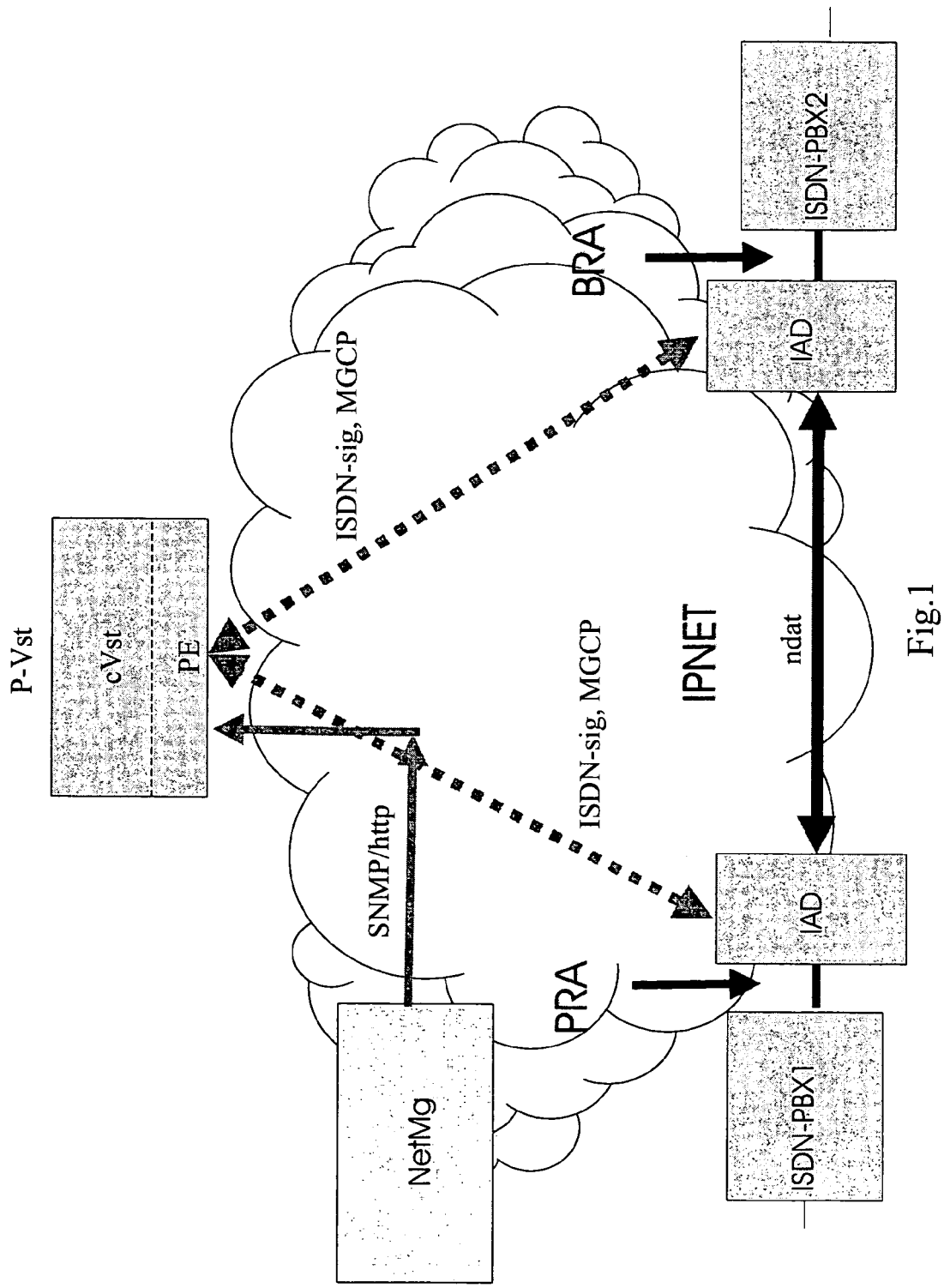
FIG. 1: shows an arrangement of network elements with inventive handling of ISDN accesses in a packet-based exchange.

In FIG. 1, two ISDN private branch exchanges ISDN-PBX1 and ISDN-PBX2 are connected to a packet network IPNET via two peripheral adapters or subscriber-side devices IAD. The peripheral adapters IAD are, for example, IADs or MTAs. User data ndat can be exchanged between the two peripheral adapters IAD, for example in the course of a telephone call routed via the packet-based network IPNET. In this way two subscribers connected to the private branch exchanges ISDN-PBX1 and ISDN-PBX2 can communicate with each other. The private branch exchange ISDN-PBX1 is connected to one of the peripheral adapters IAD by means of a PRA access with thirty user data channels and a signaling channel. The second private branch exchange ISDN-PBX2, on the other hand, is connected to the other of the peripheral adapters IAD by means of a BRA access with two user data channels and a signaling channel. The transmission of user data ndat via the packet network IPNET is controlled by a packet-oriented exchange P-Vst. For the purpose of user data transmission control, the packet-oriented exchange P-Vst exchanges signaling information ISDN-sig with the peripheral adapter IAD. The user data transmission is controlled for example using the MGCP (Media Gateway Control Protocol) protocol or the H.248 protocol. Generally, an exchange consists of peripheral units PE, e.g. access units for subscribers or lines, as well as central units, such as e.g. a central computer platform, a message buffer, a switching matrix, protocol termination facilities, background memory, etc. The part of the exchange comprising the central units with the totality of all peripheral units for controlling connections (CC-PE) is referred to as the central core of a packet-oriented exchange cVst (cVst: German abbreviation standing for core exchange). In addition there are further peripheral units such as, for example, the packet control units (PCU) for adapting to the packet-based network interfaces. The switching network (SN) is not an essential component of a packet-based exchange. Important central units are usually duplicated. According to the invention, an adaptation is performed in the peripheral units PE, by means of which the two different ISDN accesses PRA and BRA can be represented and controlled in the same uniform way in the central core cVst of the packet-oriented exchange P-Vst, namely as BRA accesses. The network management NetMg administers and configures the means provided for adaptation in the peripheral devices PE e.g. using the SNMP (Simple Network Management Protocol) protocol, via data transfer on an FTP (File Transfer Protocol) or TFTM (Trivial File Transfer Protocol) basis or via the Web using the http (hypertext transfer protocol) protocol. The logical representation of the ISDN user data channels and/or the logical ports of the ISDN user data channels are set up and administered in the packet-oriented exchange P-Vst by the network management NetMg. ISDNA signaling messages can be transported between the peripheral adapters IAD and the packet-oriented exchange P-Vst using the SCTP (Stream Control Transmission Protocol) protocol and ISDN-specific adaption layer (e.g. IUA). SS7 signaling messages can also be efficiently transmitted in IP (Internet protocol) networks using the SCTP protocol. The DSS1 (Digital Signaling System No. 1) protocol is used, for example, for the signaling between the ISDN private branch exchanges ISDN-PBX1 and ISDN-PBX2 and the respective associated peripheral adapter IAD.

Figure 2:
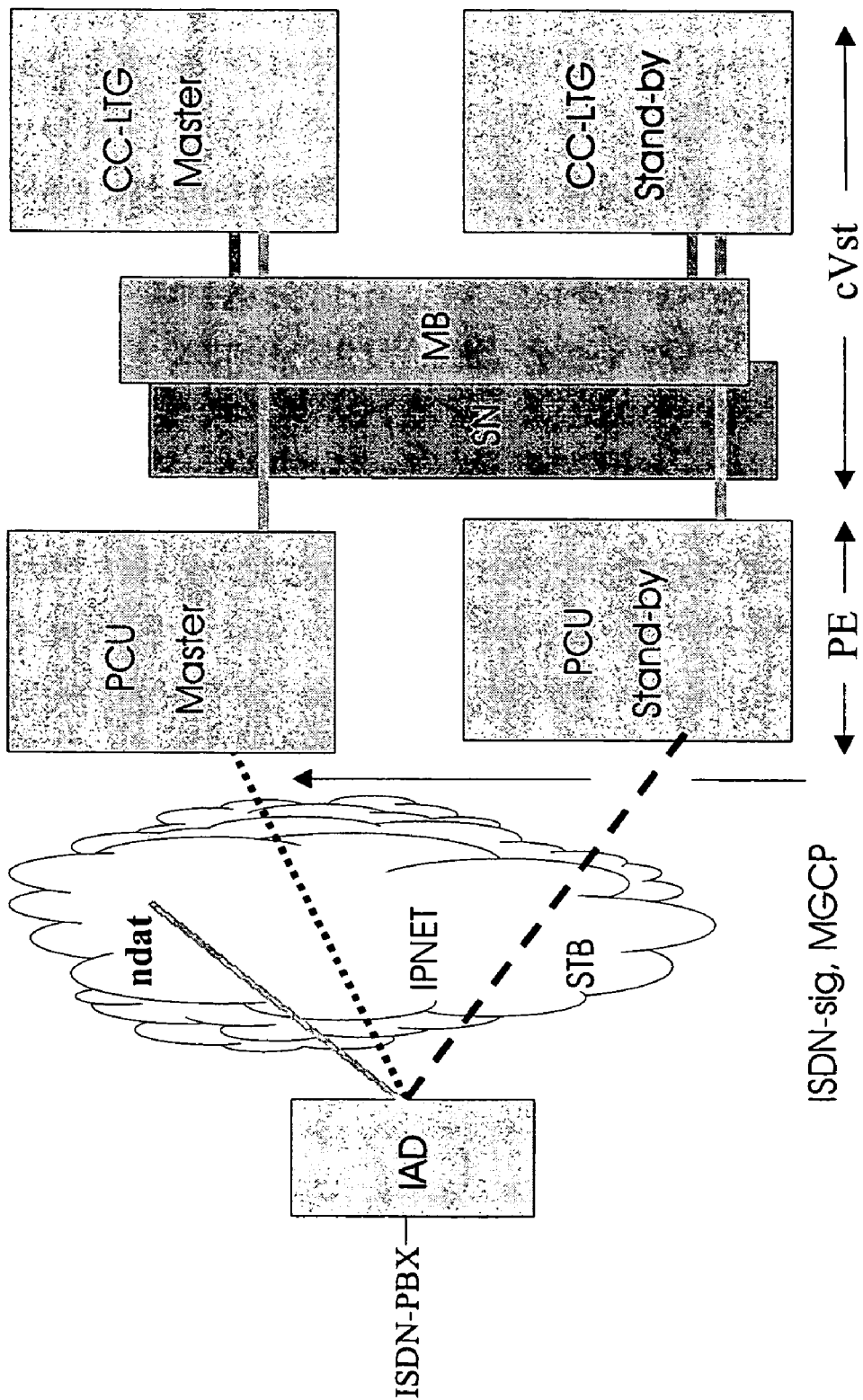
FIG. 2: is a schematic representation of a packet-oriented exchange and signaling information routed to the packet-oriented exchange via a packet network.
Figure 3:
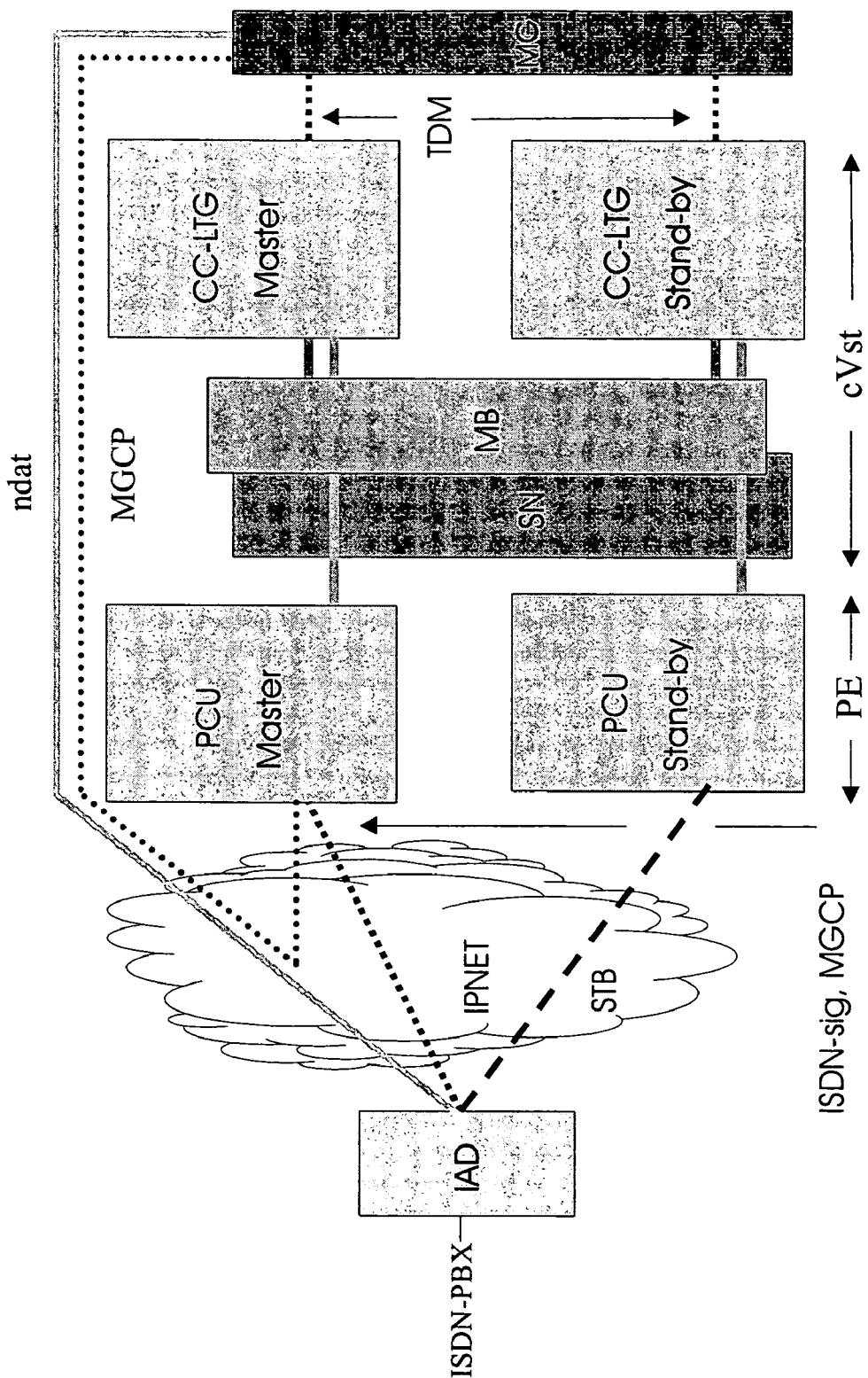
FIG. 3: is a schematic representation of a packet-oriented exchange and signaling information and user data routed to the packet-oriented exchange via a packet network.

FIG. 2 and FIG. 3 shows details of a packet-oriented exchange P-Vst which can be used in the context illustrated in FIG. 1. The control functions for voice connections are handled by a line trunk group CC-LTG (CC-LTG: stands for call control line trunk group) which is duplicated for the purpose of ensuring fault resilience (failover group is identified by "Stand-by" in the figure). The central core cVst additionally comprises a message buffer MB and optionally a switching matrix SN. The peripheral units PE comprise a packet control unit PCU which is also duplicated (Stand-by). The packet control unit executes control functions for the transmission of user data ndat from a network access device or a gateway via the packet network IPNET. The transmission is controlled e.g. by means of the MGCP protocol. The packet control unit PCU usually serves a plurality of so-called media gateway interfaces, for which the control protocol (e.g. MGCP) is terminated and control information is adapted for processing by the central core cVst of the packet-oriented exchange P-Vst. The signaling information ISDN-sig exchanged with the peripheral adapter IAD and the messages for controlling the user data transmission are transferred to the packet control unit PCU before further processing by the packet-oriented exchange P-Vst takes place. If the master packet control unit PCU fails, the messages or information exchanged with the network access device IAD is routed via the standby packet control unit PCU Stand-by (in figures FIG. 2 and FIG. 3 the corresponding data stream is identified by the reference symbol STB (STB for: Stand-by)). FIG. 2 and FIG. 3 show two different scenarios in relation to the user data routing. In contrast to TDM networks, in FIG. 2 the user data ndat is not routed via the exchange, but is transferred directly via the packet network IPNET. On the other hand, the scenario shown in FIG. 3 makes provision for the user data ndat to be routed via the packet-oriented exchange P-Vst. Under data ndat is transmitted from the network access device IAD to a media gateway MG, where it is adapted for the transmission via a TDM network, and then transmitted to the line trunk group CC-LTG via a communication section TDM operated by means of the time division multiplex technique. According to the exemplary embodiment, means for adapting parts of the signaling information ISDN-sig relating to the ISDN access type are provided in the master packet control unit PCU. It is advisable to provide these means in the standby packet control unit as well, in order to ensure the functionality is retained in the event of fault conditions.

Figure 4:
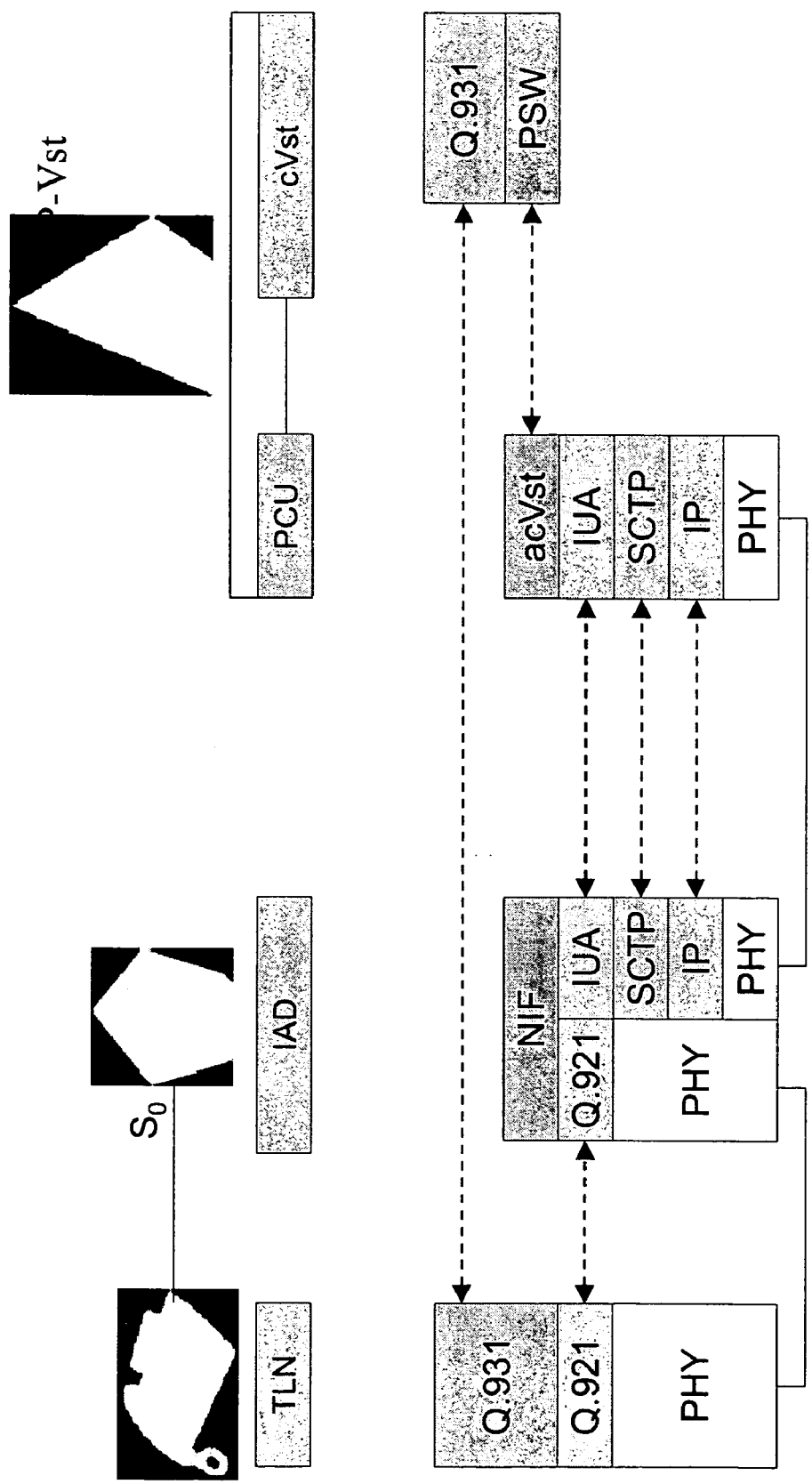
FIG. 4: is a schematic representation of protocols or protocol stacks during the exchange of signaling information between a terminal device, a network access device and a packet-oriented exchange.

FIG. 4 illustrates the exchange of signaling information at protocol level between a terminal device TLN of a network access device IAD and a packet-oriented exchange P-Vst comprising a packet adaptation unit PCU (packet control unit) and a central core cVst. The terminal device is connected as a BRA via an $S_0$ interface. The DSS1 protocol is used. With this protocol, a distinction can be made between the physical layer (Layer 1), data link layer (Layer 2) and network layer (Layer 3) according to the OSI (Open Systems Interconnection) model. The data link layer is described in the standards ITU-T Q.920 (ISDN user-network interface data link layer—General aspects) and ITU-T Q.921 (SDN user-network interface—Data link layer specification). Layer 3 signaling messages, which are described in the standards ITU-T Q.930 (ISDN user-network interface layer 3—General aspects) and ITU-T Q.931 (SDN user-network interface layer 3 specification for basic call control), are then forwarded, possibly following adaptation by means of the SCTP (stream control transmission protocol) protocol and suitable DSS1 adaptations (IUA) in the peripheral adapter on the packet network side. Different protocols or protocol stacks used are shown in the figure: on the network layer, terminal device TLN and central core cVst of the packet-oriented exchange P-Vst communicate using the specifications laid down in the Q.931 standard. The specifications for the exchange of D channel signaling information between terminal device TLN and peripheral adapter IAD on the data link layer are defined in the Q.921 standard. The physical layer is identified by the reference symbol PHY. The signaling messages are transmitted between the peripheral adapter IAD and the packet adaptation unit PCU by packet-based means. The protocol stack used for this comprises an IP (Internet Protocol) level above which there lies the SCTP protocol and an ISDN-specific adaption layer IUA. The peripheral adapter additionally comprises NIF (nodal internetwork function) functions for adapting for the TDM-side and packet network-side protocol stack. The packet adaptation unit PCU has functions acVst for adapting information and messages for processing by the central core cVst of the packet-oriented exchange P-Vst. By means of these functions acVst data can be transferred to the processor software PSW in the central core cVst.

Figure 5:
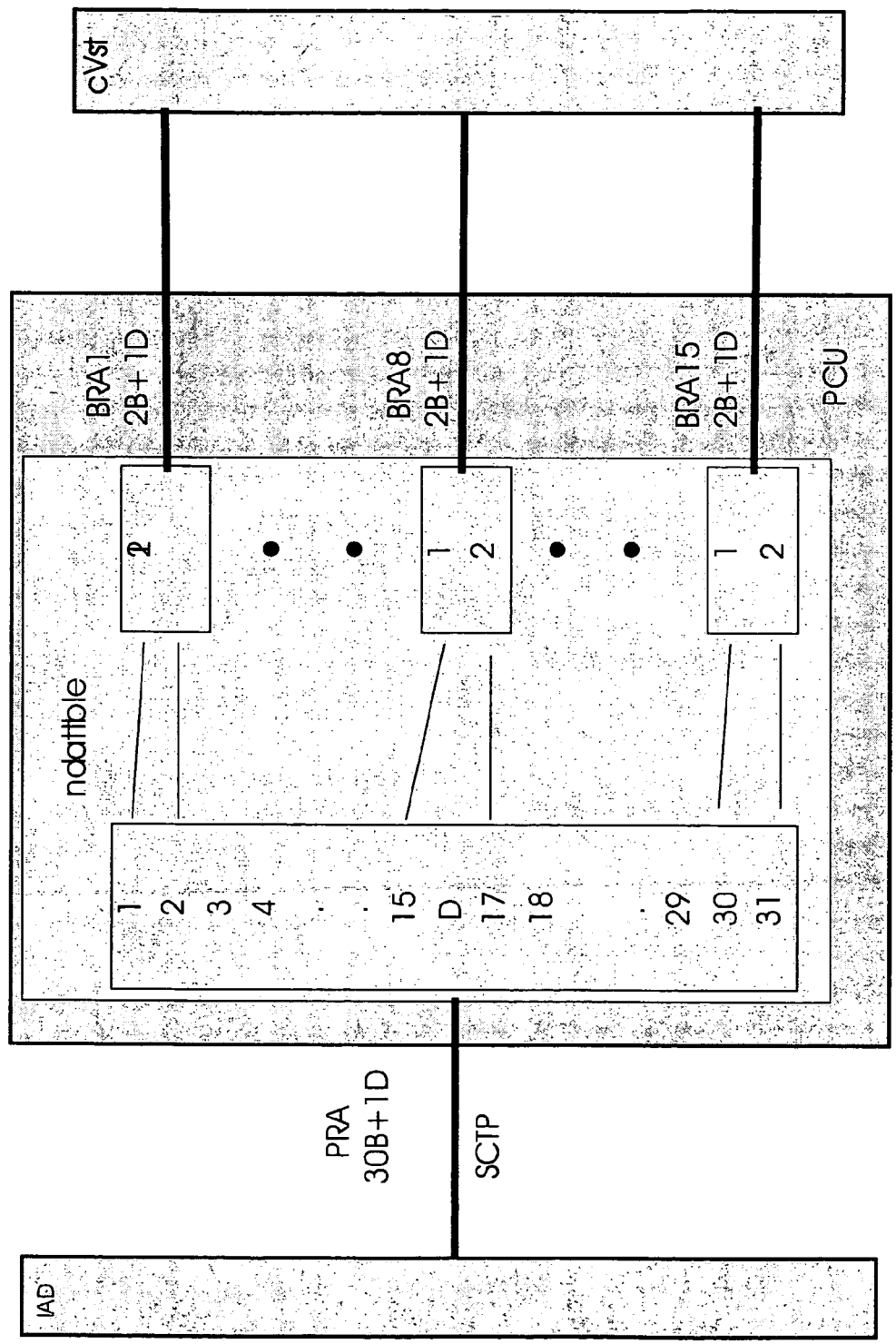
FIG. 5: shows an inventive reassignment of the user data channels in the course of an ISDN access-independent representation in the packet-oriented exchange.

FIG. 5 shows how the user data references can be adapted for the purpose of representation of a PRA access by BRA accesses in the central core cVst of the packet-oriented exchange P-Vst. The PRA access has thirty basic channels or user data channels and a signaling channel or D channel. This state of affairs is reflected in FIG. 5 by the reference symbol 30B+1D. This PRA access is represented in the central core cVst of the packet-oriented exchange P-Vst by fifteen BRA accesses BRA1 . . . BRA15, each comprising two user data channels and one signaling channel or D channel (reference symbol for BRA configuration: 2B+1D). In the packet control unit PCU, the fifteen logical BRA accesses BRA1 . . . BRA15 are assigned or mapped to the physical PRA access with the aid of a conversion table ndattble. In this process the two basic channels of the first BRA access BRA1 are mapped to the user data channels 1 and 2 of the PRA access. The two basic channels of the second BRA access BRA2 are then mapped to the user data channels 3 and 4 of the BRA access. In this way, two basic channels of the BRA accesses are transferred at a time to two user data channels of the BRA access. In the numbering according to the conversion table ndattble it is important to note that the channel with the number 16 of the BRA access is reserved for the signaling and consequently does not need to be taken into account when the user data references are changed. The table shown provides a rule for changing user data references, such as e.g. the user data channel number, in the signaling messages. The referencing of the user data channels is adapted. user data itself does not need to be subject to any adaptation. The exchange of signaling information, e.g. the transmission of a connection setup message, between peripheral adapter IAD and the packet adaptation unit PCU is effected by means of the SCTP protocol. In an exchange-side concentration of the user data channels, fewer than fifteen BRA accesses are mapped to the PRA access. This is flexible and easy to implement to the extent that the BRA accesses are logical but not physical accesses. A concentration makes sense, for example, when the data throughput of the PRA access is considerably less than the maximum capacity and therefore only a small proportion of user data channels of the PRA are occupied simultaneously even in load situations.

Figure 6:
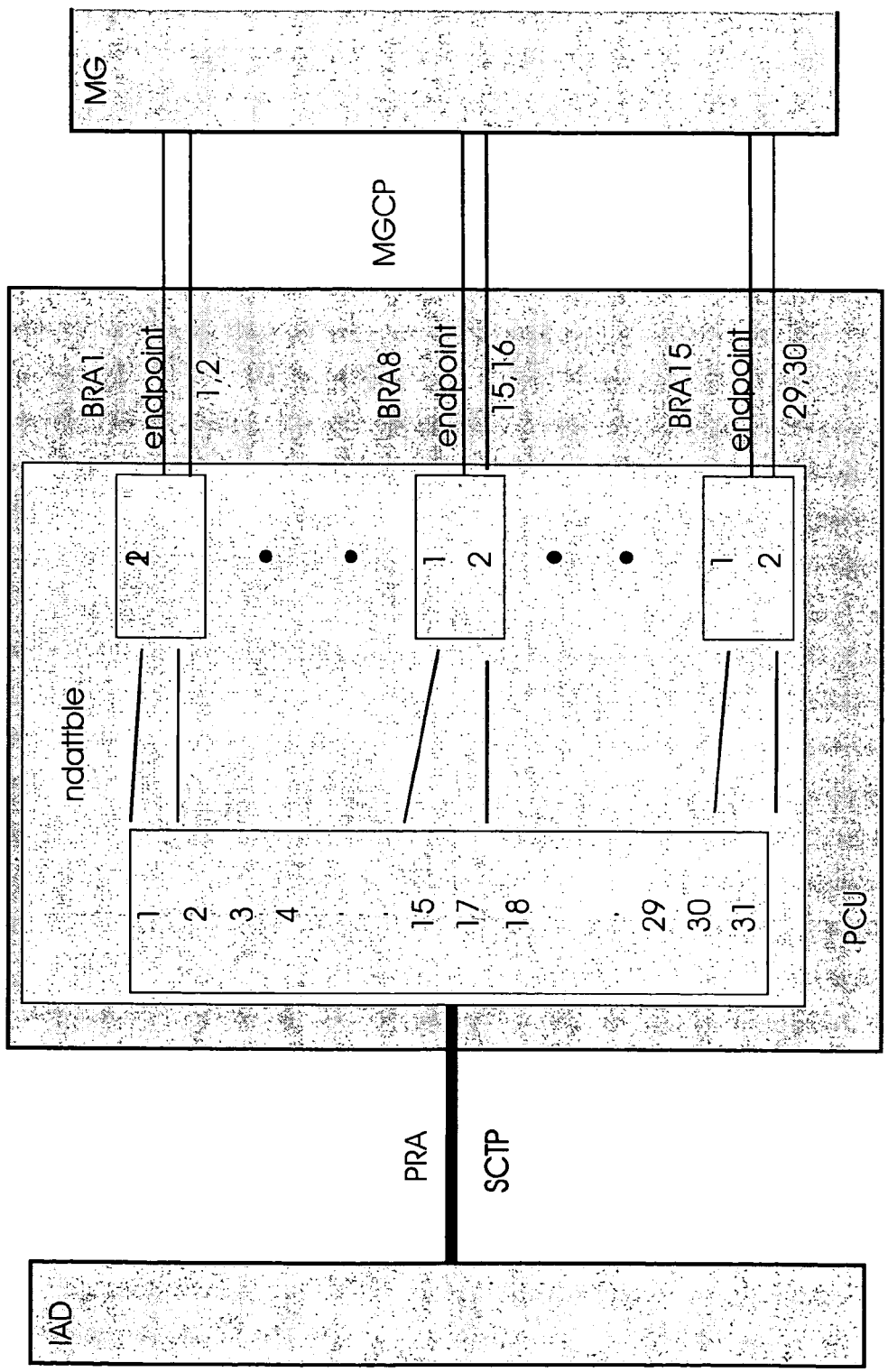
FIG. 6: shows a reassignment of the user channel control corresponding to FIG. 5, FIG. 7: shows an inventive adaptation of the call references.

FIG. 6 shows a corresponding conversion of signaling information for user data control, e.g. of the user data routing, in the packet network. A conversion of this kind is necessary in order to control the user data channels between peripheral adapter IAD and remote subscribers according to FIG. 2 and to control the user data channel between peripheral adapter IAD and front-end media gateway according to FIG. 3, where signaling information for user data control is transmitted by the packet adaptation unit PCU to the peripheral adapter IAD and the media gateway MG.

The protocol used for this is, for example, the MGCP protocol, in which each B channel is defined as a separate endpoint.

Figure 7:
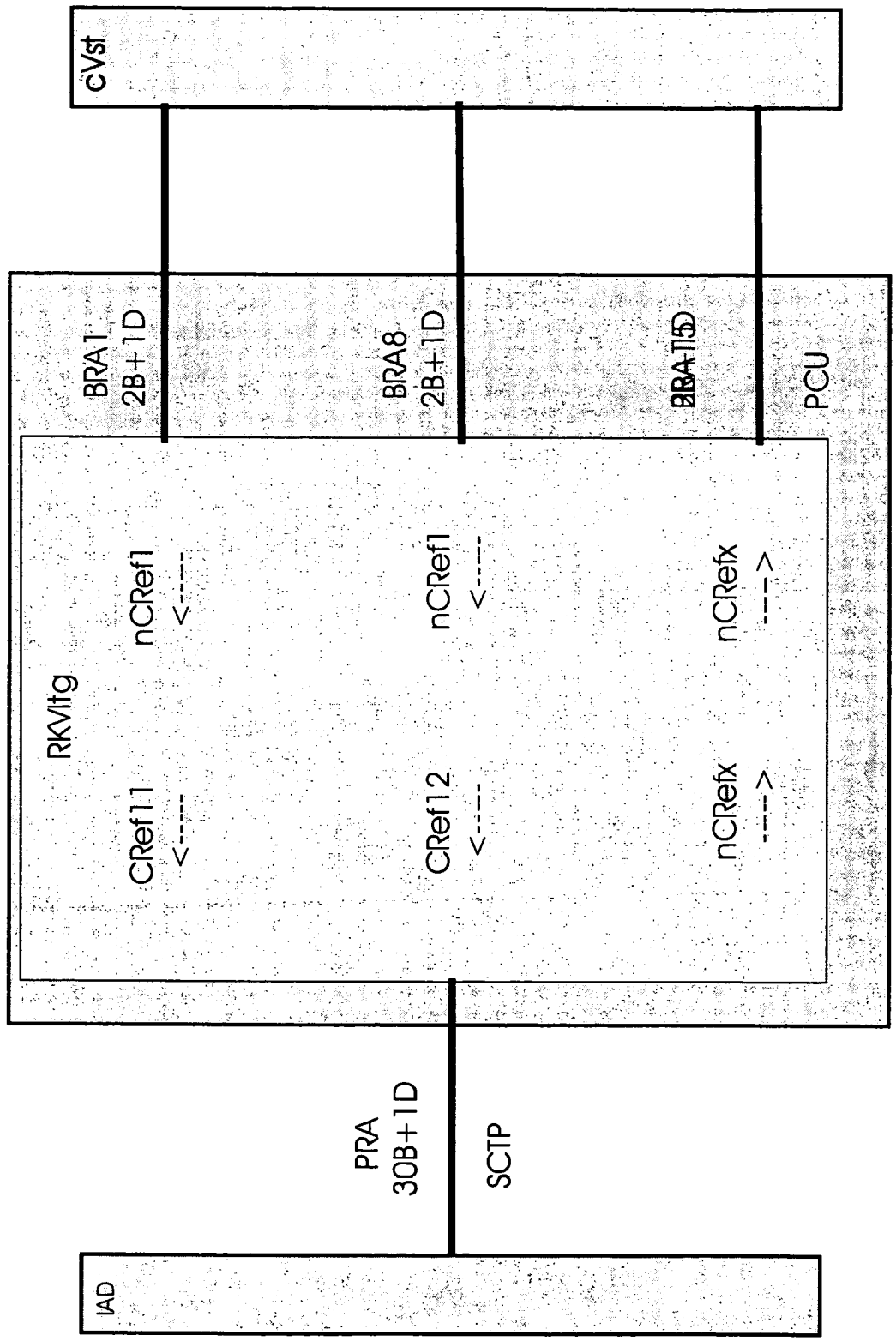

FIG. 7 shows the inventive handling of the call references for the scenario according to FIGS. 1 to 3. Call references are assigned temporarily and on a connection-related basis per access or D channel. Consequently, identical call references can be used for different D channels of the BRA accesses in the central core cVst of the packet-oriented exchange P-Vst, in which the control functions for voice connections are handled. A situation of this kind can occur for example if an A subscriber calls a B subscriber connected to the private branch exchange ISDN-PBX1 shown in FIG. 1. Call references of the BRA accesses which are transmitted to the packet adaptation unit PCU are adapted by a call reference management facility RKVltg for further use on the ISDN private branch exchange side. In this process identical call references, for example nCRef1 for the accesses BRA1 and BRA2, are mapped to different call references CRef11 and CRef12 in order to produce uniqueness within the D channel of the PRA access. Call references newly assigned on the side of the ISDN private branch exchange ISDN-PBX1, such as for example nCRefx, do not need to be adapted in the packet adaptation unit PCU. Call references transmitted via the D channel of the PRA access in the direction of the packet-oriented exchange P-Vst are unique within the D channel and, of course, also retain this uniqueness after distribution to the D channels of the different logical BRA accesses. The transmission of the call references or signaling messages which contain the call references between the peripheral adapters IAD and the packet-oriented exchange P-Vst is preferably implemented by means of the SCTP protocol and ISDN-specific adaption layer (e.g. IUA).

The invention claimed is:

1. A method for exchanging signaling information between an ISDN access and a central core of a packet-oriented exchange via a peripheral unit of the packet-oriented exchange, comprising:
   by the peripheral unit;
      adapting a signaling information transmitted by the ISDN access from a first ISDN access type to an independent ISDN access type to provide for ISDN access type-independent handling by the central core; and
      adapting a signaling information transmitted by the central core from the independent ISDN access type to the first ISDN access type,
   wherein different first types are represented by the same independent types in the central core of the packet-oriented exchange, and
   wherein the first type is different than the independent type.

2. The method according to claim 1, wherein the peripheral unit adapts the signaling information exchanged between the ISDN access and the central core of the packet-oriented exchange such that the signaling information appears as the first type for the ISDN access and appears as the independent type for the packet-oriented exchange.

3. The method according to claim 2, wherein the signaling information is adapted for mapping user data channels such that the data channels are mapped between the first type and the independent type.

4. The method according to claim 3, wherein the mapping is performed in the peripheral unit with at least one table.

5. The method according to claim 4, wherein the table is set up and administered by the network management.

6. The method according to claim 3, wherein the independent access type is represented in the central core as at least one basic rate access type.

7. The method according to claim 6, wherein the first ISDN access type is the primary rate access type.

8. The method according to claim 4, wherein a concentration of user data channels is performed during the mapping.

9. The method according to claim 4, wherein call references and user channel references are adapted to one another for mapping different user data channels differentiated according to the respective ISDN access type.

10. The method according to claim 1, wherein the signaling information exchanged between the ISDN access and the peripheral unit of the packet-oriented exchange is exchanged by a peripheral adapter.

11. The method according to claim 10, wherein a Media Gateway Control Protocol or the H.248 protocol is used between the peripheral adapter and the packet-based exchange for signaling the control of the user data channel.

12. The method according to claim 1, wherein the different first access types are a basic rate access type and a primary rate access type, and wherein the different access types are represented by the basic rate access type.

13. A peripheral unit for adaptation functions of a packet-oriented exchange, comprising:
   a controller for adapting signaling information transmitted between an ISDN access to a central core of the packet-oriented exchange,
   wherein an access type on the packet network side is in accordance with a BRA access,
   wherein an access type on the ISDN access side is in accordance with a PRA access, and
   wherein the controller adapts the signaling between the access types.

14. The peripheral unit according to claim 13, further comprising a device for adapting the signaling information corresponding to different ISDN access types, and a device for adapting the signaling information for mapping user data channels differentiated according to the respective ISDN access type to one another.

15. The peripheral unit according to claim 14, wherein a table is used for adapting signaling information for mapping user data channels differentiated according to the respective ISDN access type to one another.

16. The peripheral unit according to claim 13, wherein the different ISDN access types are given by a BRA access on the packet network side and a PRA access on the ISDN access side.

17. The peripheral unit according to claim 13, wherein the signaling information is adapted by call references and user channel references.

18. The peripheral unit according to claim 13, wherein the peripheral unit is a packet adaptation unit.

19. The peripheral unit according to claim 13, further comprising a packet-oriented exchange having at least one peripheral unit.

20. The peripheral unit according to claim 19, further comprising a packet-oriented exchange, wherein the peripheral unit is duplicated.

* * * * *